2,811,499

COMPOSITION OF NYLON POWDER AND SILICA AEROGEL

Laurence R. B. Hervey, West Concord, Mass., assignor, by mesne assignments, to The Polymer Corporation, Reading, Pa., a corporation of Pennsylvania No Drawing. Application May 29, 1953, Serial No. 358,559

5 Claims. (Cl. 260—37)

This invention relates to the process of producing molded synthetic linear polyamides, and in particular to improving the pourability of granulated synthetic linear polyamide powder. In an application entitled Method of Preparing Finely Divided Nylon Powder, Serial No. 202,405, filed December 22, 1950, in the names of Louis L. Stott and Laurence R. B. Hervey, now U. S. Patent 2,639,278, a method of preparing finely divided synthetic linear polyamides was described. Another method was also described in an application entitled Method of Preparing Finely Divided Polyamides, Serial No. 273,566, filed February 26, 1952, in the names of Louis L. Stott and Laurence R. B. Hervey, now U. S. Patent 2,742,440. This latter application also defined the linear polyamides to which the process applies.

These polyamides as described above, or as otherwise identified hereafter, can be obtained, for example, by self-polymerization of monoaminomonocarboxylic acid, or by reacting a diamine with a dibasic carboxylic acid in substantially equimolecular amounts, it being understood that reference herein to amino acids, diamines and dibasic carboxylic acids is intended to include the equivalent amide-forming derivatives of these reactants.

These linear polyamides include also polymers obtained by admixture of other linear polymer-forming reactants, as for instance glycol-dibasic acid mixtures in the case of polyester amides, with the mentioned polyamide-forming reactants. The best results in the practice of the invention described herein, however, are obtained with unmodified straight polyamides. In the simple polyamides the average number of carbon atoms separating the amide group is at least two. On hydrolysis with hydrochloric acid, the amino acid polymers yield the amino acid hydrochloride, and the diamine-dibasic acid polymers yield the diamine hydrochloride and the dibasic carboxylic acid. For the sake of simplicity, the linear polyamides described above will be referred to herein as nylon, but only those polyamides which are insoluble in the solvents described and claimed herein at room temperature are intended to be included in the appended claims, and are the subject of this invention. The polyamides to which this invention pertains, as described above, also may be defined briefly as fiber-forming synthetic linear polycarbonamides in which the carbonamide groups are an integral part of the main chain.

In general, finely divided polyamides to which this invention applies are prepared by dissolving the polyamide in a solvent at elevated temperatures, the solvent being one which dissolves the polyamide at elevated temperatures but is a non-solvent at lower temperatures. The resulting powder may be washed, if desired, to remove the solvent used to dissolve it. The powder is dried and granulated to the proper size of aggregate, which preferably is between 10–150 mesh. The ultimate particle size of the polyamide particles within the aggregate resulting from this process is quite small, being less than 40 microns in diameter. The steps of dissolving the precipitate and washing should be carried out under conditions which prevent oxidation of the nylon. The powder thus prepared is satisfactory in many respects as a molding powder. The powder may be formed into desired objects in a mold under a pressure of from 5–50 tons per square inch and sintered, if desired, to obtain increased strength. Such a procedure forms a portion of the subject matter described and claimed in U. S. Patent 2,695,425 in the name of Louis L. Stott.

A silica aerogel may be added to nylon powder to which one or more of a number of fillers have been admixed. As disclosed in U. S. Patent 2,695,425 in the name of Louis L. Stott up to 85% of the total bulk volume may be filler.

The fillers that may be added cover a wide variety of materials. In general it has been found that for most applications the fillers are advantageously finely divided, although bonding may be secured to larger pieces, if desired. If an abrasive is to be manufactured, abrasive particles are incorporated with the nylon; these include the usual abrasives such as diamond dust, ground silica, Carborundum, chalk, Alundum, tungsten carbide, etc. For other purposes metal powders, such as copper, lead, or iron, may be added to give the desired properties and these are readily incorporated with the nylon. For still other purposes carbon or graphite particles, or molybdenum disulphide particles, may be incorporated with nylon. In some cases ceramic materials with special dielectric properties are advantageously mixed with nylon. Among these are titanium dioxide and various titanates, in particular combinations of titanium dioxide with alkaline earths. On occasion polytetrafluoroethylene is a useful filler. The physical or electrical characteristics of molded nylon articles may therefore be tailored to meet the desired specifications where the incorporation of other materials is advantageous. The filler should be substantially non-reactive with the nylon, have a higher melting point than the temperature to which the nylon must be raised to sinter it and not subject to any substantial amount of decomposition during the heating step.

In most cases, the fillers serve to reduce hydroscopic or thermal expansion as compared to articles made entirely of nylon and aid materially in securing dimensional accuracy through reduced distortion during sintering. The reasons for these improved characteristics are not clear but have been repeatedly observed.

Difficulty has been experienced, however, in pouring the granulated powder into the mold. This difficulty is accentuated and is particularly acute with automatic presses where a free-flowing powder is desirable to permit adequate and rapid filling of the mold.

It is an object of this invention to improve the pourability of granulated nylon powder. Another object is to improve the pourability of granulated nylon powder without adversely affecting the characteristic useful qualities of the pressed articles.

These and other objects may be accomplished by adding from ½%–5% by weight of a finely divided silica. A silica aerogel of the type described in U. S. Patent 2,093,454 to Samuel Kistler, is particularly effective. A satisfactory commercial product of this type is the material known under the trade name "Santocel."

The washed and dried granulated powder is admixed with the finely divided silica referred to above by tumbling the two together until even distribution of the silica is accomplished. While tumbling the two materials together is preferred, any other suitable means of forming an intimate mixture as by stirring them together or by any of the accepted means of agitating the mixture of powders is acceptable.

It is surprising that finely divided silica aerogel should be unique in its property of markedly increasing the pourability of granulated nylon powder. Many materials have been tried, for example—graphite, mica, talc, and hydrogenated cotton seed oil. None of these materials have served to increase the pourability as determined by the A. S. T. M. designation D392–38 "Testing Molding Powders Used in Manufacturing Molded Electrical Insulators."

The following examples will further illustrate the invention. They are intended for illustrative purposes only and not to limit the invention.

*Example I*

150 grams of the polymer of hexamethylene adipamide in flake form was dissolved in 850 grams of ethylene glycol in a nitrogen atmosphere at 185° C. during a period of one hour. The solution was filtered, and cooled to 170° C. 2000 cc. of distilled water at room temperature were poured into the glycol solution with agitation. The nylon precipitated and the precipitate was washed until glycol-free with distilled water. The glycol-free powder was air dried, to remove most of the water, followed by vacuum drying to reduce the moisture content to less than one percent.

The vacuum dried powder was granulated by passing it through a 16 mesh screen. 50 grams of powder were placed in a standard funnel as described in A. S. T. M. designation D392–38, and time of flow from the funnel was found to be 25 seconds. To 50 grams of powder were added 0.5 gram of Santocel with tumbling. The powder was placed in a standard funnel and time of flow was found to be 19 seconds.

*Example II*

150 grams of the polymer of epsilon caprolactam in flake form was dissolved in 850 grams of ethylene glycol in a nitrogen atmosphere at 185° C. during a period of one hour. The solution was filtered, and cooled to 170° C. 2000 cc. of distilled water at room temperature were poured into the glycol solution with agitation. The nylon precipitate was washed until glycol-free with distilled water. The glycol-free powder was air dried, to remove most of the water, followed by vacuum drying to reduce the moisture content to less than one percent.

The vacuum dried powder was granulated by passing it through a 16 mesh screen. A comparison was made of the flowability of powder containing the addition of 1 part by weight of aerogel to 100 parts of powder with powder containing no aerogel. The standard A. S. T. M. method described in Example I was followed, and the results showed that the addition of aerogel reduced the time required by the powder to pass through the funnel by approximately 25 percent.

*Example III*

150 grams of the polymer of hexamethylene sebacamide in flake form was dissolved in 850 grams of ethylene glycol in a nitrogen atmosphere at 185° C. during a period of one hour. The solution was filtered and cooled to 170° C. 2000 cc. of distilled water at room temperature were poured into the glycol solution with agitation. The nylon precipitated and was washed until glycol-free with distilled water. The glycol-free powder was air dried, to remove most of the water, followed by vacuum drying to reduce the moisture content to less than one percent. The vacuum dried powder was granulated by passing it through a 16 mesh screen.

A comparison was made of the flowability of powder containing the addition of 1 part by weight of aerogel to 100 parts of powder with powder containing no aerogel. The standard A. S. T. M. method described in Example I was followed, and the results showed that the addition of aerogel reduced the time required by the powder to pass through the funnel by approximately 25 percent.

*Example IV*

The procedure of Example I was followed except that 0.5% by weight of powdered polyethylene oxide having a molecular weight of 6000 was intimately mixed with the nylon powder as a mold lubricant. 0.5% of finely divided silica aerogel was added by tumbling as an aid to pourability. In accordance with the standard A. S. T. M. method designated D392–38, "Testing Molding Powders Used in Manufacturing Molded Electrical Insulators," powder without the aerogel took 21.6 seconds and powder with the aerogel took 19.9 seconds to flow through the funnel.

*Example V*

A mixture of 50% powdered nylon and 50% finely divided powdered copper would not flow under the standard test conditions. The nylon powder was prepared, and dried in accordance with the procedure of Example I. With the addition of 1%, 2%, and 3% silica aerogel the flowability test took 156, 242, and 336 seconds respectively.

It will be seen from the above examples that finely divided silica is effective for increasing the flowability or pourability of polyhexamethylene sebacamide. Other nylon polyamides, when subdivided in accordance with the applications referred to above, show similar increased pourability rates upon the addition of silica in the amounts of from ½–5% by weight. While amounts in excess of 5% by weight do not decrease the volume of powder per second poured into a mold, additions of silica in excess of 5% increase the bulk of the mixture to such an extent that the actual weight of polymer which can be poured into a mold in a given time falls off to uneconomical levels if the amount of silica is increased beyond 5%.

I claim:

1. An intimate mixture comprising finely divided synthetic linear polyamide and a silica aerogel said aerogel being present in an amount equal to from .5% to 5% by weight of said polyamide, said polyamide being one which is a fiber-forming synthetic linear polycarbonamide in which the carbonamide groups are an integral part of the main chain, the ultimate particle size of said polyamide being less than 40 microns in diameter.

2. The product in accordance with claim 1 wherein the polyamide is polyhexamethylene adipamide.

3. The product in accordance with claim 1 wherein the polyamide is polyhexamethylene sebacamide.

4. The product in accordance with claim 1 wherein the polyamide is the polymer of epsilon caprolactam.

5. An intimate mixture comprising a mixture of finely divided synthetic linear polyamide, a filler and a silica aerogel, said aerogel being present in an amount equal to from .5% to 5% by weight of said polyamide, the filler being present in an amount up to 85% by volume of said mixture, said polyamide being one which is a fiber-forming synthetic linear polycarbonamide in which the carbonamide groups are an integral part of the main chain, said polyamide having an ultimate particle size of less than 40 microns in diameter.

References Cited in the file of this patent

FOREIGN PATENTS 1,005,744  France _____ Jan. 2, 1952